Figure 1:
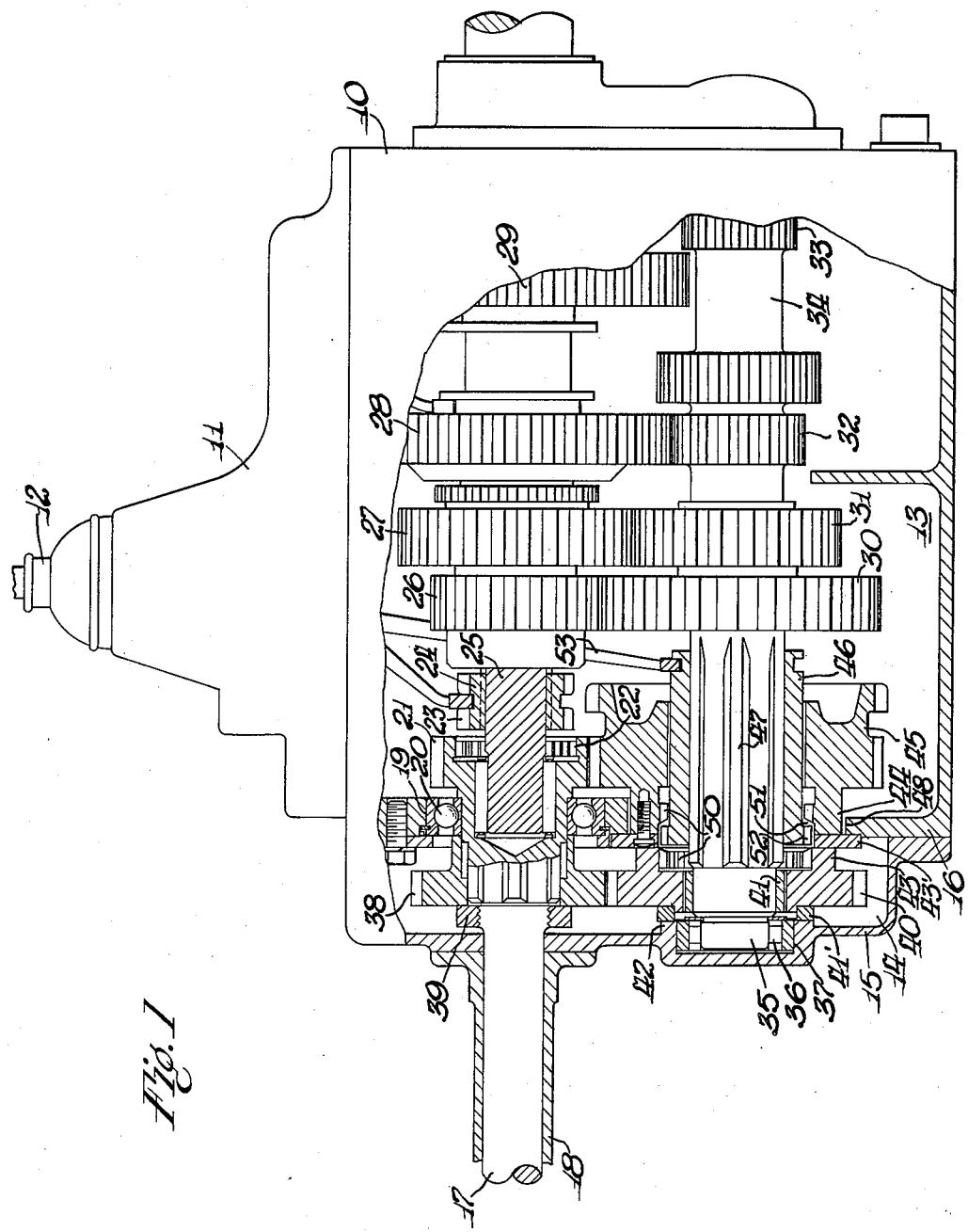

March 15, 1949.　　　F. W. AVILA　　　2,464,479
TRANSMISSION
Filed June 24, 1946

Inventor
Frank W. Avila
By Paul O. Pippel
Atty.

Patented Mar. 15, 1949

2,464,479

UNITED STATES PATENT OFFICE 2,464,479

TRANSMISSION

Frank W. Avila, Columbia City, Ind., assignor to International Harvester Company, a corporation of New Jersey Application June 24, 1946, Serial No. 678,978

6 Claims. (Cl. 74—338)

1

This invention relates to a transmission. More specifically it relates to a change-speed transmission provided with a two-speed countershaft.

In the construction of transmissions, particularly those designed for automotive vehicles, it has been conventional to provide a casing having alined input and output shafts and a countershaft driven from the input shaft with a plurality of gear ratios provided by one set of gears on the countershaft and one set on the output shaft. It is highly desirable to provide additional speed ranges such as over-drives and under-drives particularly for load-carrying vehicles such as trucks.

The principal object of the present invention is to provide an improved change-speed transmission having a two-speed countershaft.

Another important object is to provide a two-speed countershaft for a standard transmission in a minimum amount of space.

Another object is to provide a two-speed countershaft construction which can be readily adapted to existing design of change-speed transmission.

The above objects and others which will be apparent from a detailed description to follow are attained by a construction such as shown in the single figure of the drawing.

The drawing is a side elevation of a transmission case with a portion of the case broken away to show certain of the interior structure in elevation and other portions in section.

In the drawing, a transmission casing 10 is provided with a conventional cover 11 which carries a gear shaft lever 12. The transmission casing 10 provides a main compartment 13. An auxiliary compartment 14 is provided by an end cover 15 which cooperates with an end wall 16 of the main compartment 13, said end wall being in effect a partition wall between the main compartment 13 and the auxiliary compartment 14.

An input shaft 17 from which power is received from the clutch of the vehicle power plant extends through a sleeve member 18 secured to the cover 15 and through the partition wall 16. Said wall is formed with a large opening 19 in which a ball bearing assembly 20 is fitted. Said assembly provides a rotatable support for the input shaft 17.

Within the main compartment 13 the input shaft 17 is formed with an integral gear 21. Said gear is provided with internally formed dental clutch teeth 22 adapted to engage teeth 23 of a member 24 keyed to an output shaft 25 for rotation therewith and for axial sliding movement

2 with respect thereto. The output shaft 25 is conventional in every respect with the transmissions now in universal use in automotive vehicles. A plurality of gears 26, 27, 28, and 29 mounted on the output shaft are adapted to engage gears 30, 31, 32, and 33 formed as a gear cluster integrally with a countershaft 34. These gears may be in constant mesh with dental clutch engaging means as shown for several of the gears or may be axially shiftable for engagement as represented by the gears 29 and 33. The shifting means for these gears are not shown in detail as they may be of conventional construction operable by the shifting lever 12. The countershaft 34 is provided at one end with a portion 35 of reduced diameter which is carried by a roller bearing assembly 36 mounted in a cylindrical recess 37 formed in the auxiliary compartment cover 15. A gear 38 located in the auxiliary compartment 14 is splined on the input shaft 17 for rotation therewith, being secured against axial displacement by a threaded collar 39. Said threaded collar also holds the ball bearing assembly 20 in position against axial movement on the shaft 17. A gear 40 positioned in the auxiliary compartment 14 is rotatably mounted on a bearing sleeve 41 fitted on a portion of the countershaft 34. Gear 40, which will be termed the third gear for purposes of identification, is in constant mesh with the gear 38, which will be termed the first gear. The gear 40 abuts an annular thrust member 41' which in turn abuts an annular projection 42 carried interiorly of the end wall 15 concentric with respect to the countershaft.

Opposite the thrust collar 41' the gear 40 is provided with an annular projecting hub portion 43 which abuts an annular member 43' rigidly secured to a similar projecting hub portion 44 formed on a gear 45 mounted in the main compartment 13 at the side of the partition wall 16 opposite the gear 40. The gear 45 is rotatably mounted on a sleeve member 46, said sleeve being keyed on a splined portion 47 of the countershaft 34.

The partition wall 16 is provided with an opening 48 slightly larger in diameter than the outside diameter of the hub portion 44 on the gear 45. Said hub portion extends through said opening. The annular member 43' is secured to said hub portion within the auxiliary chamber 14, said annular member being larger in outside diameter than the opening 48 and abutting the auxiliary compartment side of the partition 13 around the opening 48.

The hub portions 43 and 44 of the gears 40 and 45 are formed interiorly as dental clutch elements or members, a plurality of dental clutch teeth 50 being provided within each of the hub portions. The teeth 50 on the hub portion 43 are spaced a substantial distance from the teeth 50 on the hub portion 44 to provide an annular space 51. The sleeve 46 is shiftable by means illustrated as a shifting fork 53 to engage the teeth 52 with either of the sets of teeth 50, whereby the gear 40 may be secured for rotation with the countershaft 34 or the gear 45 may be secured for rotation with said shaft.

For the purpose of better identifying the significant elements as above described, the gear 21 will be referred to as the second gear and the gear 45 will be referred to as the fourth gear. In the operation of the transmission as described, the countershaft 34 may be driven at two different speeds by shifting the sleeve 46 from its neutral position as shown in either direction. When it is shifted to the left, the third gear 40 driven by the first gear 38 from the input shaft will drive the countershaft 34 at one speed. With the countershaft operating at this speed any one of a plurality of speed ratios may be selected by the sets of mating gears functioning between countershaft 34 and output shaft 25. By moving the sleeve 46 in the other direction the countershaft may be driven at another speed through the fourth gear 45 and the second gear 21. With this different speed for the countershaft, an entirely different set of speed ratios may then be selected by the mating sets of gears between the countershaft and the output shaft. The provision of a neutral position for the sleeve 46 permits disconnecting the countershaft 34 when a direct drive is obtained by engaging the dental teeth 23 of the member 24 with the teeth 22 of the gear 21.

It will be understood that applicant has shown only a preferred embodiment of his improved two-speed countershaft for transmissions, and that he claims as his invention all modifications falling within the scope of the appended claims.

What is claimed is:

1. A change speed transmission having a partition wall, an input shaft, and a countershaft extending through said wall, gears fixed to the input shaft on opposite sides of said wall, a gear rotatably mounted on the countershaft at one side of said wall in mesh with one of the gears on the input shaft, a sleeve splined to the countershaft at the other side of said wall, said wall being provided with an opening through which said sleeve is slidable, a gear rotatably mounted on said sleeve in mesh with the other gear formed on the input shaft, the two gears on the countershaft having internal dental clutch elements formed thereon, said elements being spaced apart in an axial direction, said sleeve having external dental gear teeth formed thereon and adapted to extend in the space between the dental clutch elements on the gears, said teeth being adapted by endwise movement of the sleeve to engage the dental clutch elements of either of the two gears.

2. A change speed transmission having a partition wall, an input shaft, and a countershaft extending through said wall, gears fixed to the input shaft on opposite sides of said wall, a gear rotatably mounted on the countershaft at one side of said wall in mesh with one of the gears on the input shaft, a sleeve splined to the countershaft at the other side of said wall, said wall being provided with an opening through which said sleeve is slidable, a gear rotatably mounted on said sleeve in mesh with the other gear formed on the input shaft, the two gears on the countershaft having internal dental clutch elements formed thereon, said elements being spaced apart in an axial direction, said sleeve having external dental gear teeth formed thereon and adapted to extend in the space between the dental clutch elements on the gears, said teeth being adapted by endwise movement of the sleeve to engage the dental clutch elements of either of the two gears, the space between said dental clutch elements being sufficient to provide a neutral position for said sleeve with neither gear engaged, and means for axially moving said sleeve.

3. A change speed transmission having a partition wall, an input shaft extending through said wall and supported therein by a bearing assembly, and a countershaft extending through said wall, gears fixed to the input shaft on opposite sides of said wall, a gear rotatably mounted on the countershaft at one side of said wall in mesh with one of the gears on the input shaft, a sleeve splined to the countershaft at the other side of said wall, said wall being provided with an opening through which said sleeve is slidable, a gear rotatably mounted on said sleeve in mesh with the other gear formed on the input shaft, the two gears on the countershaft having abutting hub portions formed with internal dental clutch elements, said elements being spaced apart in an axial direction, said sleeve having a set of external dental gear teeth formed thereon and adapted to extend in the space between the dental clutch elements on the gears, said teeth being adapted by endwise movement of the sleeve to engage the dental clutch elements of either of the two gears, the space between said dental clutch elements being sufficient to provide a neutral position for said sleeve with neither gear engaged, and means for axially moving said sleeve.

4. A change speed transmission having an input shaft, an output shaft, and a countershaft, a plurality of gears arranged on the output shaft, a plurality of gears arranged on the countershaft, said sets of gears being adapted to be drivingly engaged with each other and with said shafts to select a plurality of gear ratios, a partition wall through which said input shaft and said countershaft pass, a bearing assembly mounted in said wall for rotatably supporting said shaft, a first gear keyed to the input shaft on one side of said wall, a second gear integral with the input shaft on the other side of said wall, a third gear rotatably mounted on the countershaft at one side of said wall in mesh with the first gear, a sleeve splined to the countershaft at the other side of said wall, said wall being provided with an opening through which said sleeve is slidable, a fourth gear rotatably mounted on said sleeve in mesh with the second gear, the two gears on the countershaft having abutting hub portions with internal dental clutch elements formed therein, said elements being spaced apart in an axial direction, said sleeve having a set of external dental gear teeth formed thereon and adapted to extend in the space between the dental clutch elements on the gears, said teeth being adapted by endwise movement of the sleeve to engage the dental clutch elements of either of the two gears, the space between said dental clutch elements being sufficient to provide a neutral position for said sleeve with neither gear engaged, and means for axially moving said sleeve, said means being interiorly of the partition wall and beyond the gear mounted on said sleeve.

5. A change speed transmission comprising a casing, a partition dividing said casing into a large main compartment for housing change speed gears and a narrow auxiliary compartment, an input shaft extending through the auxiliary compartment into the large main compartment, an output shaft in the main compartment in alinement with the input shaft, and a countershaft extending through both compartments, a plurality of gears arranged on the output shaft, a plurality of gears arranged on the countershaft, said sets of gears being adapted to be drivingly engaged with each other and with said shafts to select a plurality of gear ratios, a first gear fixed to the input shaft in the auxiliary compartment, a second gear fixed to the input shaft in the main compartment, a third gear in the auxiliary compartment rotatably mounted on the countershaft in mesh with the first gear, a sleeve splined to the countershaft in the main compartment and extending to the partition wall, a fourth gear rotatably mounted on said sleeve in mesh with the second gear, said partition having an opening concentric with the countershaft, the two gears on the countershaft being formed with internal dental clutch elements, said elements being spaced apart, said sleeve having external dental gear teeth formed thereon, said teeth being adapted by endwise movement of the sleeve to engage the dental clutch element of either of the two gears, the space between said dental clutch elements being sufficient to provide a neutral position for said sleeve with neither gear engaged, and means in the main compartment for axially moving said sleeve.

6. A change speed transmission comprising a casing, a partition dividing said casing into a large main compartment for housing change speed gears and a narrow auxiliary compartment, an input shaft extending through the auxiliary compartment into the large main compartment, an output shaft in the main compartment in alinement with the input shaft, and a countershaft extending through both compartments, a plurality of gears arranged on the output shaft, a plurality of gears arranged on the countershaft, said sets of gears being adapted to be drivingly engaged with each other and with said shafts to select a plurality of gear ratios, a bearing assembly mounted in the partition wall for rotatably supporting the input shaft, a first gear keyed to the input shaft in the auxiliary compartment, a second gear integral with the input shaft in the main compartment, a third gear in the auxiliary compartment rotatably mounted on the countershaft in mesh with the gear keyed to the input shaft, a sleeve splined to the countershaft in the main compartment and extending to the partition wall, a fourth gear rotatably mounted on said sleeve in mesh with the gear formed on the input shaft, said partition having an opening concentric with the countershaft, the two gears on the countershaft having abutting hub portions being formed with internal dental clutch elements, said elements being spaced apart, said sleeve having external dental gear teeth formed thereon, said teeth being adapted by endwise movement of the sleeve to engage the dental clutch element of either of the two gears, the space between said dental clutch elements being sufficient to provide a neutral position for said sleeve with neither gear engaged, and means in the main compartment for axially moving said sleeve.

FRANK W. AVILA.

REFERENCES CITED

The following references are of record in the file of this patent:

UNITED STATES PATENTS

| Number | Name | Date |
| --- | --- | --- |
| 1,550,058 | Carhart | Aug. 18, 1925 |
| 1,775,944 | Nelson | Sept. 16, 1930 |
| 2,300,502 | Haltenberger | Nov. 3, 1942 |

FOREIGN PATENTS

| Number | Country | Date |
| --- | --- | --- |
| 372,978 | Great Britain | May 19, 1932 |